(12) United States Patent
Albert (10) Patent No.: US 11,633,262 B2
(45) Date of Patent: Apr. 25, 2023

(54) SELF-LIGATING BRACKET FOR ORTHODONTICS

(71) Applicant: Bernhard Foerster GmbH, Pforzheim (DE)

(72) Inventor: Christopher Albert, Remchingen (DE)

(73) Assignee: Bernhard Foerster GmbH, Pforzheim (DE)

(*) Notice: Subject to any disclaimer, the term of this patent is extended or adjusted under 35 U.S.C. 154(b) by 188 days.

(21) Appl. No.: 17/247,848

(22) Filed: Dec. 26, 2020

(65) Prior Publication Data

US 2021/0113306 A1 Apr. 22, 2021

Related U.S. Application Data (63) Continuation of application No. PCT/EP2019/067239, filed on Jun. 27, 2019.

(30) Foreign Application Priority Data

Jun. 29, 2018 (DE) ...................... 10 2018 115 871.8

(51) Int. Cl.
*A61C 7/28* (2006.01)

(52) U.S. Cl.
CPC .................................. *A61C 7/287* (2013.01)

(58) Field of Classification Search
CPC .... A61C 7/00; A61C 7/12; A61C 7/30; A61C 7/287; A61C 7/285; A61C 7/28; A61C 7/14

See application file for complete search history.

(56) References Cited

U.S. PATENT DOCUMENTS 5,466,151 A * 11/1995 Damon ................. A61C 7/287
 433/10
2008/0011331 A1 1/2008 Flasch

FOREIGN PATENT DOCUMENTS

| EP | 2 381 880 B1 | 3/2014 |
| JP | 2003-503084 A | 1/2003 |
| JP | 2012-500053 A | 1/2012 |
| WO | 99/40871 A1 | 8/1999 |
| WO | 2010/019768 A1 | 2/2010 |

* cited by examiner

*Primary Examiner* — Amy R Sipp
*Assistant Examiner* — Sydney J Pulvidente
(74) *Attorney, Agent, or Firm* — Orbit IP (57) ABSTRACT

A self-ligating bracket for orthodontics, includes: a groove for receiving an archwire; a slide which can be displaced between a closed position in which it bridges the groove and an open position in which the groove is open; and a locking element which can hold the slide both in its closed position and in its open position. In the gingival and/or in the occlusal wall, a recess is open towards the slide in which the locking element is inserted which is directed against the slide. The locking element is displaceably guided in the recess and has elastically or elastomerically bendable tines which, when the slide is pushed over the convex end of the locking element, are displaced deeper into the recess, thereby being elastically or elastomerically bent and thereby building up a restoring force.

22 Claims, 5 Drawing Sheets

SELF-LIGATING BRACKET FOR ORTHODONTICS

CROSS-REFERENCE TO RELATED APPLICATIONS

This continuation application claims priority to PCT/EP2019/067239 filed on Jun. 27, 2019 which has published as WO 2020/002546 A1 and also the German application number 10 2018 115 871.8 filed on Jun. 29, 2018, the entire contents of which are fully incorporated herein with these references.

DESCRIPTION

Field of the Invention

The invention relates to a bracket with the features indicated in the preamble to claim 1.

Background of the Invention

Such a bracket is known from EP 2 381 880 B1. In order to close its groove, which in technical parlance is also referred to as "slot", the known bracket has a slide, which can be displaced in lateral guide grooves, which are provided both in the occlusal wall and in the gingival wall of the bracket. In order to be able to hold the slide in both its open position and its closed position, a recess open toward the slide is provided in one of the two walls, in which is provided a flexible thrust bearing that bears an inflexible cylinder, whose jacket surface protrudes a ways out of the recess, and is pressed by the flexible thrust bearing against the lower side of the slide, which is its lingual side. Interacting with a relief formed on the lower side of the slide, this arrangement comprised of the thrust bearing and the cylinder lying thereon performs its task of holding the slide in both its open position and in its closed position. However, special care and a corresponding manufacturing effort are required while installing the thrust bearing and the cylinder lying thereon into the bracket, in particular in view of the small dimensions of the bracket.

SUMMARY OF THE INVENTION

An object of the present invention is to provide a way in which the effort for manufacturing and assembling the bracket can be reduced for a bracket with the small dimensions of the kind mentioned at the outset.

This object is achieved by a bracket having the features indicated in claim 1, as well as by a bracket having the features indicated in independent claim 2. Advantageous refinements of the invention are the subject of dependent claims.

The bracket according to the invention has a base, an occlusal wall extending from the base, a gingival wall extending from the base, a groove, which separates the occlusal wall and the gingival wall from each other, and continuously extends in the mesial to distal direction, a slide, which has a labial side and a lingual side, and is held in a guide provided in the occlusal wall and/or in the gingival wall, and can be displaced in the gingival-occlusal direction in the guide between a closed position, in which the slide bridges the groove, and an open position, in which the groove is open in labial direction, and means that can hold the slide in both its closed position and in its open position; these means comprise, in the gingival wall and/or in the occlusal wall, a recess that is open toward the slide and in which is inserted a locking element, which has a convexly designed labial end protruding from the recess, is directed against the lingual side of the slide, and has a lingual end located in the recess; provided in the slide on its lingual side are a first depression and a second depression, which are arranged in such a way that the convex end of the locking element protruding from the recess engages into the first depression when the slide is in its open position, and engages into the second depression when the slide is in its closed position; adjacent to the lingual end of the locking element, there is a free space in the recess; the locking element is guided in the recess so that it can be displaced back and forth in a lingual-labial direction, and has one or more elastically or elastomerically bendable tines, which have an end facing in a labial to lingual direction, and glide onto a wall of the recess surrounding the locking element as the locking element is displaced back and forth; the recess tapers in the labial to lingual direction, wherein the recess and locking element are compatible with each other in terms of their shape and position in such a way that, when the slide is pushed over the convex end of the locking element, thereby forcing the convex end of the locking element out of the first or second depression and deeper into the recess, at least one of the tines in the tapering section of the recess is deflected by the wall, on which it glides deeper into the recess, and is elastically or elastomerically bent.

The invention has significant advantages:

Instead of the arrangement comprised of a flexible thrust bearing and a hard cylinder lying thereon provided in prior art, only a one-piece locking element is provided in the bracket according to the invention.

The locking element can be manufactured cost-effectively and with the required precision via injection molding.

The locking element has a convex end, and is positioned in the recess of the bracket in such a way that the convex end protrudes from the recess. If the locking element has a rectangular cross section, the surface of the convex end can be part of a cylinder jacket surface that protrudes from the recess in the same way that the jacket surface of the cylinder does in prior art. As a result, the slide of the bracket can be adopted unchanged from prior art according to EP 2 381 880 B1. However, the locking element can also have a circular cross section. The convex end can then be spherical in design, in particular with a surface shaped like a spherical segment surface.

In order to compensate for manufacturing tolerances, it was necessary in prior art to individually adjust the position of the thrust bearing in the receptacle. For this purpose, the recess is in prior art according to EP 2 381 880 B1 is designed like a slot that extends continuously to the lower side of the bracket. This made it possible to slide the thrust bearing into the slot from the lower side, position it at the right distance from the upper edge of the recess, and fix it in this position with adhesive introduced into the slot from below. By contrast, the invention provides a recess that at some distance from its upper, labial edge has a tapering section, into which the locking element provided with one or more tines can be resiliently inserted. This solution does not require a precision as high as in prior art. Among other things, this is because the resilience important for the function of the locking element is not generated by compressing a thrust bearing block as in prior art according to EP 2 381 800 B1, but rather by bending one or several tines. For this reason, larger positional tolerances can be permitted according to the invention while positioning the locking element by comparison to prior art.

In contrast to prior art, an adhesive bonding process is in any event not required for positioning the locking element, so that the recess need not be open toward the lower side of the bracket. Regardless of the recess, the lower side of the bracket can thus be structured and provided with retentions in such a way that is best for coating the lower side with adhesive to fasten the bracket on a tooth.

Configuring the recess as a blind hole requires no special operation, but can rather be formed while manufacturing the bracket in an injection molding process, specifically while manufacturing the bracket out of plastic in a plastic injection molding process, while manufacturing the bracket out of metal via metal powder injection molding (MIM), and while manufacturing the bracket out of a ceramic via ceramic powder injection molding (CIM). If a circular outline is selected for the locking element, the recess that receives the locking element can also be a borehole.

The locking member of the present invention can have a very compact design, making it especially suitable for the miniaturized, self-ligating brackets preferred by patients.

The locking member according to the invention can be easily positioned in the bracket.

The positioning of the locking member according to the invention can be automated. This lowers the cost of manufacturing the bracket.

The locking member according to the invention is accommodated and guided in the recess protected against overload.

The locking member according to the invention can effectively prevent foreign substances from undesirably penetrating into the recess.

Within the framework of the invention, the feature "convex" is understood from a mathematical standpoint. A strictly convex surface is characterized in that, for all point pairs on the strictly convex surface, it applies that a line that connects two points on the surface intersects the surface. However, convex within the meaning of the invention is also a surface on which the lines connecting the point pairs of a first subset on the surface intersect the surface, while the lines connecting the point pairs of a second subset run on the surface. The latter applies to a convex surface, which can be intersected by a plane in such a way that the intersecting line contains a polygonal chain.

When displacing the slide between its closed position and its open position, its lower side, i.e., the lingual side of the slide, must be moved over the convex, labial end of the locking element, wherein the projection on the lower side of the slide lying between the two depressions of the lower side can only be crossed if the locking element is at the same time pressed a corresponding ways into the recess, wherein at least one tine of the locking element is bent, which generates the restoring force which displaces the labial end of the locking element out of the recess and again back into the first or second recess provided on the lower side of the slide in the open position and in the closed position of the slide.

The fact that the restoring force is generated by bending one or several tines makes it possible for the locking element to cover larger displacement paths than the cylinder in prior art according to EP 2 381 880 B1. In turn, this allows the locking element to protrude further out of the recess in the closed position of the slide than in the open position of the slide, meaning to plunge deeper into the corresponding depression on the lingual side of the slide in the closed position of the slide. The advantage to this is that the location of the slide in its closed position is better secured than in the open position. This is advantageous, because the aim is to permanently prevent the bracket from inadvertently opening in the mouth of the patient, in particular while chewing, whereas the open position is only required during treatment of the patient by the orthodontist, and the only object is to prevent the slide from falling off of the bracket in the open position. Therefore, the second depression into which the locking element engages in the closed position of the slide is deeper than the first depression into which the locking element engages in the open position of the slide.

The locking element preferably has exactly two tines, which are arranged like a fork, and identical or mirror inverted in terms of their design and arrangement. In this case, bending both tines can contribute equally to the restoring force. However, it is also possible to design both tines differently, so that they are not equally stiff. A tine can basically be so stiff in design as to only be bent slightly or not at all, whereas the other tine is more easily bent, and applies the required restoring force essentially only by virtue of its bending.

It is basically also possible to provide more than two tines, for example two adjacent pairs of tines.

Adjoining its labial edge, the recess that receives the locking element preferably has at the beginning a constant cross section on one part of its depth, and subsequently tapers. Accordingly, the locking element adjoining the convex end in this case at the beginning has a constant cross section over a specific length, which corresponds to the constant cross section of the recess, and subsequently the one or the several tines. The two constant cross sections not only ensure that the locking element is displaced in a constant direction, but can also prevent foreign substances from penetrating into the recess. The tines plunging into the tapering section of the recess build up the restoring force, which pushes forward the locking element in the closed position and in the open position of the slide so as to lock it in the respective depression on the lingual side of the slide.

While the recess preferably tapers continuously, the wall of the recess can bend at the transition from the section with a constant cross section to the section with a tapering cross section.

The locking element preferably consists of a plastic, in which the easy moldability combines with the desired elastomeric or elastic behavior. Moreover, the locking element may consist of a transparent or translucent plastic. This is advantageous when the bracket also otherwise consists of a transparent or translucent material, which can be a plastic or a ceramic. Suitable plastics for the locking element include polyaryletherketones, in particular a polyetheretherketone (PEEK), as well as other thermosets.

For reasons of mechanical stability, it is advantageous for the locking element to have a rectangular cross section in its non-tapered section. Accordingly, the recess then also has a rectangular cross section in its non-tapered area. The recess thereafter preferably tapers like a wedge. In this case, the two wedge surfaces preferably include an angle of 80° to 100°, preferably of approx. 90°. As a result, the invention can be well realized given the small displacement paths that are possible for the small brackets, and typically only measure 0.3 mm.

Preferably provided in a recess that tapers like a wedge is a locking element with only two tines arranged like a fork, whose ends preferably have an inclined surface that faces the adjacent wall surface of the recess.

In an unstressed state, the tines can lie flatly, in particular completely, against the wall of the recess in the tapering section of the recess, possibly also with their preferably provided inclined surface.

The locking element arrangement can be provided such that its convex end exerts no, or almost no, pressure on the slide when the slide is in its closed position or in its open position. However, it is advantageous for the locking function of the locking element that its convex end lies against the lingual side of the slide under a pressure, when the slide is in its open position or in its closed position.

In the closed position of the slide, the latter can in principle be secured in its location by the locking element engaging into the second depression. However, in order to make especially sure that the forces arising while chewing do not push the slide out of the second depression in the occlusal direction, a stop is preferably provided on the body of the bracket, which prevents the slide from being displaced beyond the closed position while being moved from its open position into its prescribed closed position. The stop is preferably arranged in such a way as to push the slide from occlusally incoming in the gingival direction when it is moved from the open position into the closed position against the stop.

Aside from the first and second depression, the lingual side of the slide can be flat. This shape is especially simple to fabricate for the slide. However, the lingual side of the slide can also be structured so as to be bordered not only by a flat surface outside of the first depression and the second depression. In particular, it can be advantageous that the lingual surface of the slide lie in a shared plane, except for an area lying between the first depression and the second depression and protruding relative thereto, whereas the area lying between the first depression and the second depression is also deepened relative to that shared plane, but less deepened than the first depression and the second depression. The deepened area on the lingual side of the slide can here likewise be flat in design between the first depression and the second depression.

The second depression is preferably deeper than the first depression. As a result, the slide is better secured in its closed position than in its open position.

Preferably the contour of the second depression is approximately adjusted or closely adjusted to the contour of the convex end of the locking element. The advantage to this is that the slide is fixed especially securely in its closed position, with especially little play. This advantage does not play that important a role for the open position of the slide, so that the contour of the first depression can be less well adjusted to the shape of the convex end of the locking element with no disadvantage. For example, the first depression can be a flat trough.

The first depression and the second depression may have a circular outline on the lingual side of the slide, and in particular be conical or frustoconical. For example, the angle between the two wedge-shaped or conical surfaces (hereinafter referred to as wedge surfaces) of the recess or the opening angle of the cone may measures 80° to 100°, particular approx. 90°.

BRIEF DESCRIPTION OF THE DRAWINGS

Illustrative embodiments of the invention are shown in the attached drawings. The same or corresponding parts are labeled with matching reference numbers in the embodiments.

DETAILED DESCRIPTION OF THE PREFERRED EMBODIMENTS

The bracket shown in FIGS. 1 to 7 has a concavely curved base 1, whose curvature is approximated to the front side of a tooth. On its lower side 2 forming the lingual side of the bracket, the base 1 has depressions 3 arranged in rows with approximately a rectangular cross section. An adhesive can be applied to the lower side 2 to bond the bracket onto a tooth. In this way, the adhesive meshes with the depressions 3.

The base 1 passes over into a socket 4, on which stand a gingival wall 5 and an occlusal wall 6. The two walls 5 and 6 run parallel to each other, and are separated by a groove 7, which in orthodontic parlance is also referred to as "slot", runs continuously straight from distal to mesial, and is labially open.

The gingival wall 5 is provided with a ligature wing 8 projecting in the gingival direction. A ligature wing 9 projecting in an occlusal direction is provided on the occlusal wall 6. Ligature wires can be secured thereto in a manner known to the expert. The ligature wings 8 and 9 can alternatively be divided into a respective pair of correspondingly smaller ligature wings, which lie one next to the other in a distal to mesial direction. The ligature wing has a hook-shaped extension 9a, which has no importance relative to the present invention. The invention is suitable both for brackets with such an extension 9a, and for brackets without such an extension 9a.

The groove 7 is used to receive an archwire, which is not part of the bracket, and thus not shown. Tensioning the archwire makes it possible to exert pressure on the base 10 of the groove 7 and a torque on the walls 5 and 6 of the bracket.

A labial recess 14 in the gingival wall 5 and a labial recess 15 in the occlusal wall 6 receive a primarily flatly designed slide 13 with an essentially rectangular outline. The recesses 14 and 15 have mutually parallel undercuts 11 and 12 that run occlusal to gingival, which together with the base 17 of the recess 15 and the base 20 of the recess 14 comprise sliding guides for the slide 13, which the slide 13 cannot exit in a labial direction, because the undercuts 11 and 12 prevent this. The recesses 14 and 15 lie in a shared alignment. The recess 14 passes through the occlusal wall 6, whereas the recess 15 in the gingival wall 5 ends at a stop, which is the "second" stop 18 mentioned in the claims.

Figure 5:
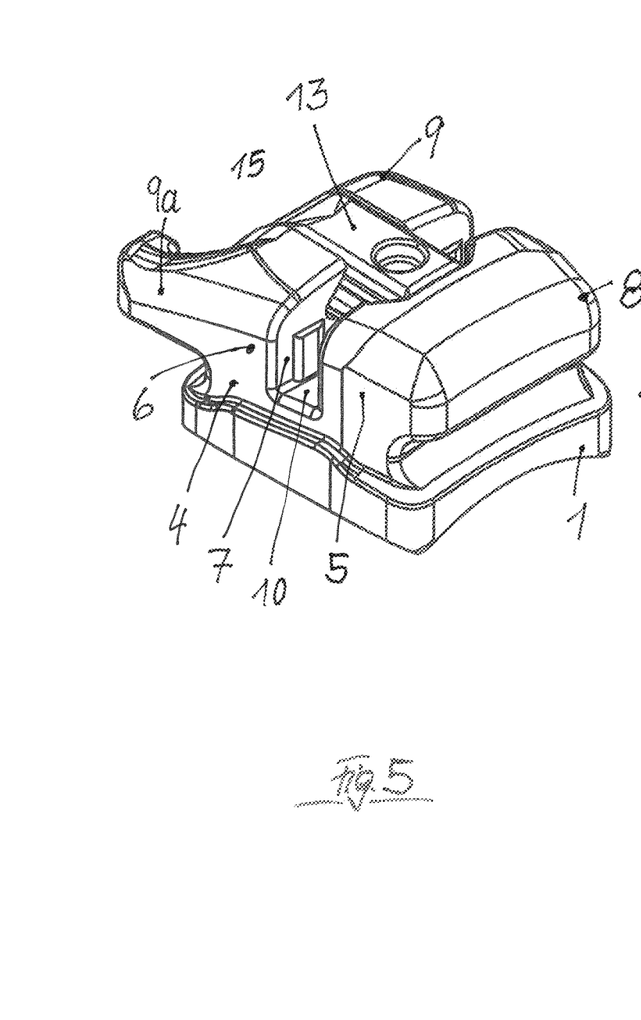
FIG. 5 shows an oblique view of the bracket, with the slide in its closed position.
Figure 6:
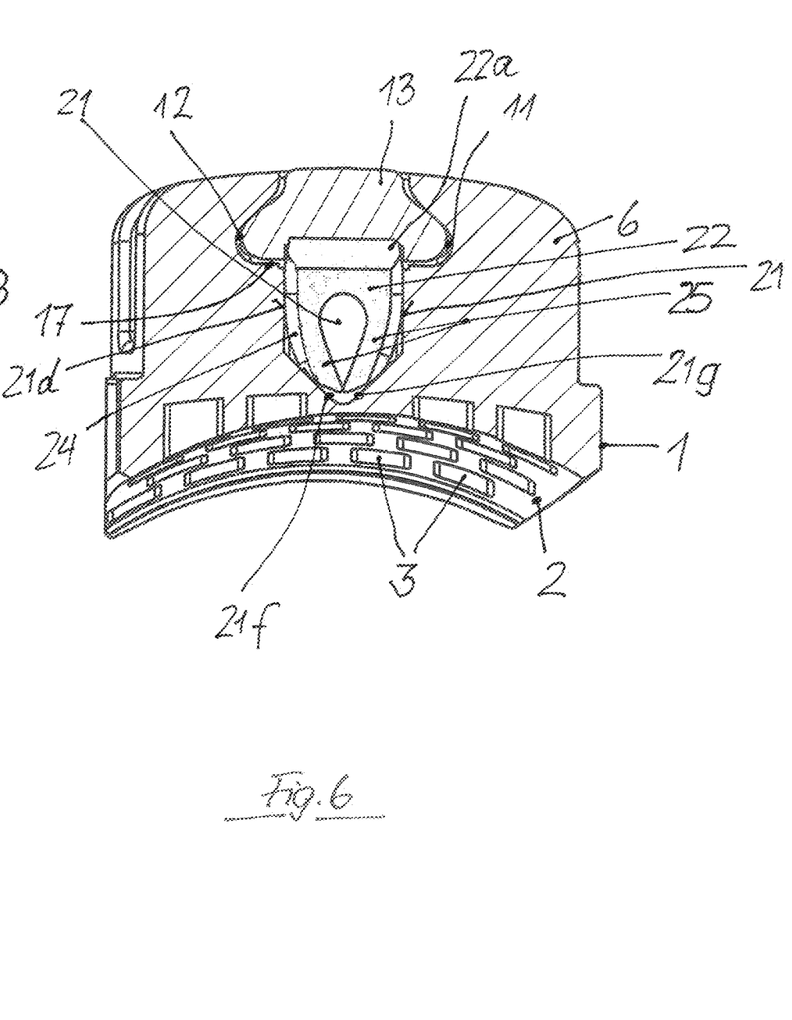
FIG. 6 shows the bracket in a section lying in the same plane as the section on FIG. 4, but with the slide in a position between the closed position and the open position.
Figure 7:
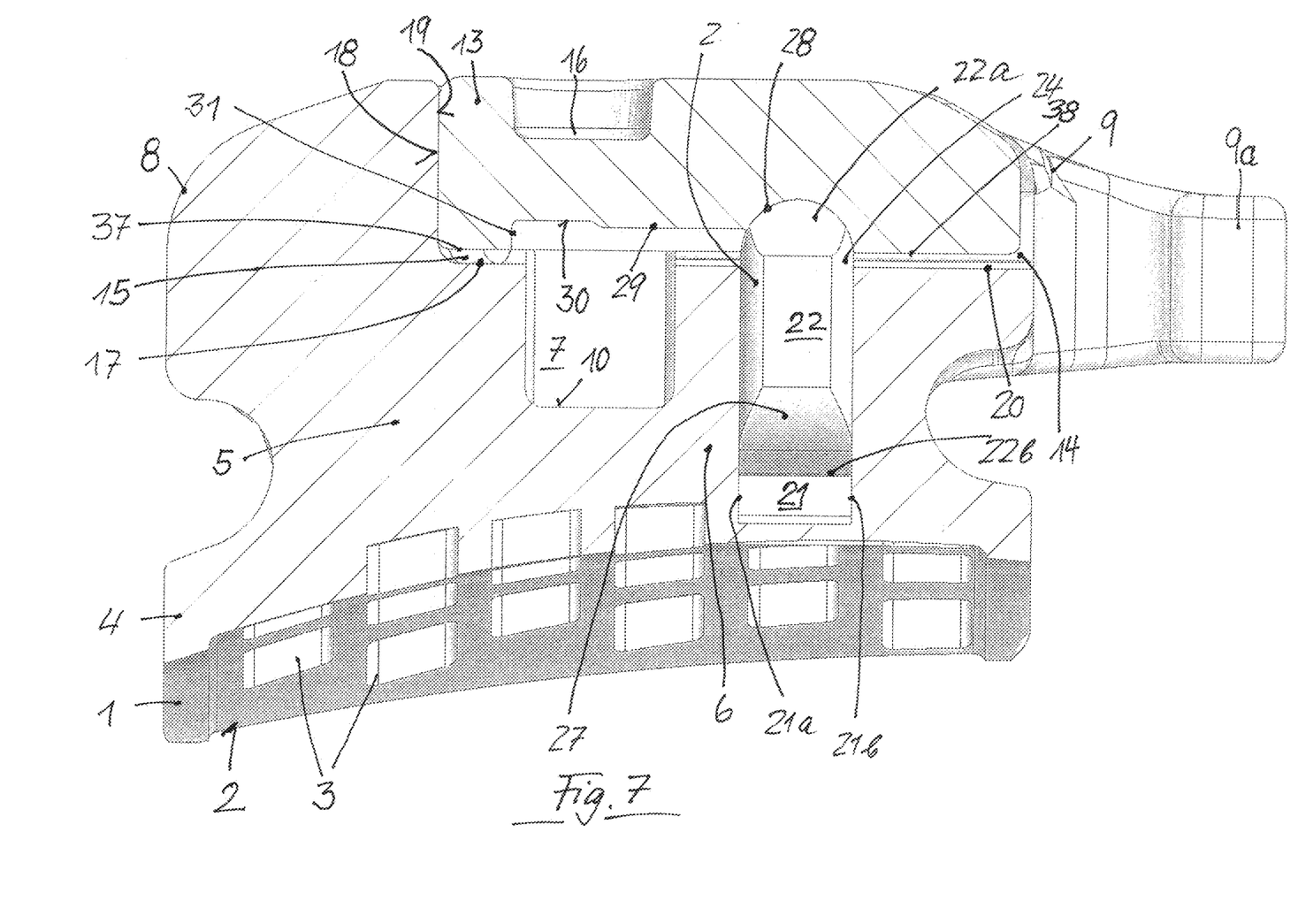
FIG. 7 shows a section through a longitudinal central plane of the bracket parallel to the two guides of the slide.

The slide 13 can be displaced back and forth in the gingival-occlusal direction in the guide formed by the recesses 14 and 15 as well as by the undercuts 11 and 12 between an open position in which the slide 13 is held only in the occlusal wall 6, and a closed position shown on FIGS. 5 to 7. In the open position, the groove 7 is labially open across the full width. In the open position, the front end 19 of the slide 13 preferably closes with the surface of the occlusal wall 6 bordering the groove 7. In the closed position, the front end 19 of the slide 13 hits the second stop 18 on the gingival wall 5, as shown especially clearly on FIG. 7. In the closed position, the slide 13 bridges the groove 7, so that an archwire running therein cannot exit the groove 7 in a labial direction.

Figure 1:
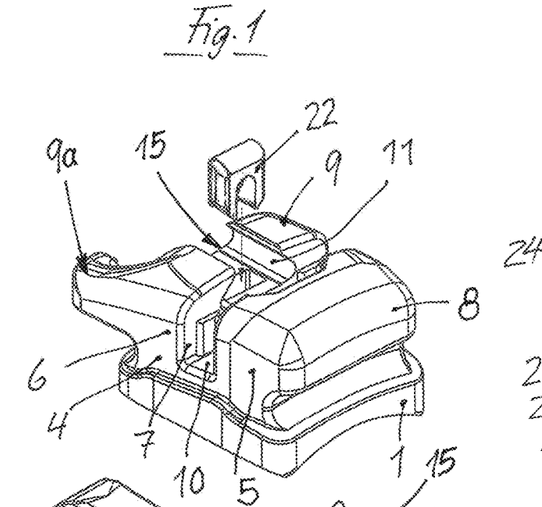
FIG. 1 shows an oblique view of a bracket according to the invention, wherein the slide and the locking element are removed.
Figure 2:
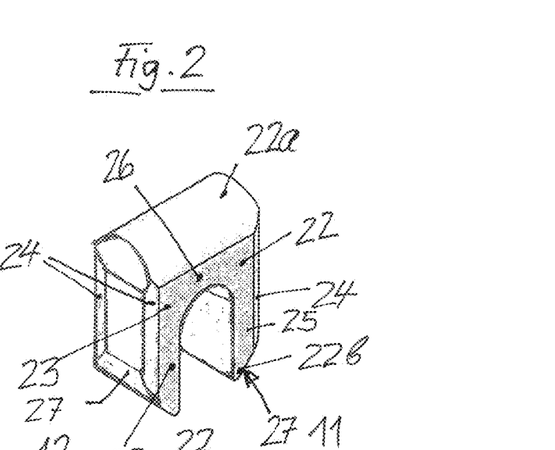
FIG. 2 shows a detail of the locking element on FIG. 1 on a magnified scale relative to FIG. 1.
Figure 3:
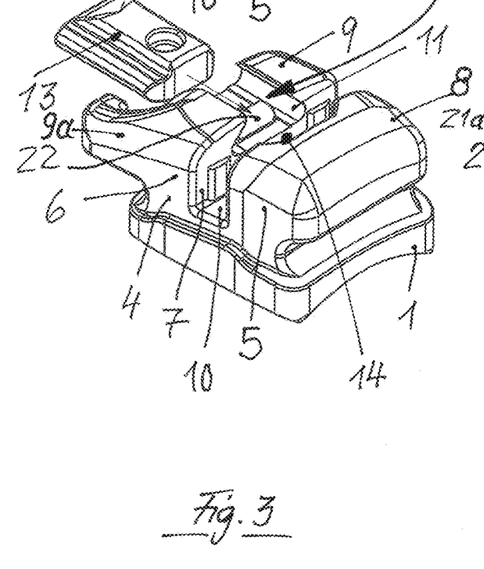
FIG. 3 shows the bracket of FIG. 1 after insertion of the locking element and before insertion of the slide.
Figure 4:
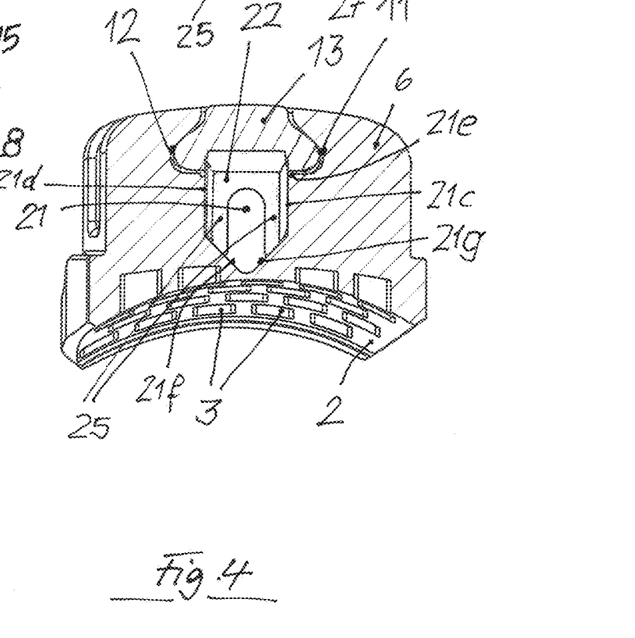
FIG. 4 shows a section though the bracket with the slide in its closed position, wherein the section is centrally placed through the locking element in a plane at a right angle to the arrow on FIG. 3.

A slit-shaped recess 21 is located in the occlusal wall 6, which extends primarily parallel to the surface of the occlusal wall 6 bordering the groove 7. The opposing surfaces 21a and 21b of the recess 21 that extend in the direction of the groove 7 run parallel to each other, see FIG. 7. The wall surfaces 21c and 21d running at a right angle to the surfaces 21a and 21b as well as at a right angle to the groove 7 run parallel to each other in a section adjacent to the labial edge 21e of the recess 21. In a section adjoining the latter, the wall surfaces running perpendicular to the surfaces 21a and 21b are no longer parallel to each other, but rather arranged at an acute angle to each other, and are thus here referred to as wedge surfaces 21f and 21g. They close the recess 21 before reaching the lower side 2 of the bracket, meaning that the recess 21 tapers like a wedge in this section, as illustrated on FIGS. 4 and 6. The locking element 22 shown on FIG. 2 is inserted in the recess 21, and is movably guided back and forth therein in the labial-lingual direction between the position shown on FIG. 4 and the position shown on FIG. 6.

The locking element 22 has a convex, labial end 22a, which in the present illustrative embodiment is shaped like a section of a cylinder jacket surface. This is adjoined by an arch-like body 23, which can have chamfers 24 on its outer edges for easier introduction into the recess 21. The arch-like body 23 consists of two mutually parallel running tines 25 and a head section 26 that connects them, which carries the convex end 22a of the locking element 22. The lingual ends 22b of the tines 25 have inclined surfaces 27, whose inclination coincides with the inclination of the wedge surfaces 21f and 21g. In a relaxed state of the kind shown on FIGS. 2 and 4, the inclined surfaces 27 of the locking element 22 thus lie completely on the wedge surfaces 21f and 21g of the recess 21, see FIG. 4, which shows the state with the slide 13 in its closed position. As depicted on FIGS. 2 and 4, the two tines 25 are arranged like a fork, and designed to match the wedge surface 21f and 21g in the lingually tapered direction.

The locking element 22 consists of a material, in particular of a plastic, which is elastically or elastomerically deformable. Therefore, the tines 25 can be moved closer to each other through exposure to outside pressure. The outside pressure can be applied by pressing the locking element 22 deeper into the recess 21 by exerting pressure on its convex end 22a. As a result, the inclined surfaces 27 of the tines 25 slide in a lingual direction, i.e., in the direction toward the lower side 2 of the bracket, and are thereby inevitably moved closer together through bending, as depicted on FIG. 6, which shows the state in which the slide 13 is located in a position between the closed position and the open position. The tines 25 can be moved closer together because a free space is present between the two tines 25 due to the arch-like shape of the body 23, as depicted on FIGS. 2, 4 and 6, as well as on FIGS. 8 to 11.

In the closed position as depicted on FIG. 7, the convex end 22a protrudes over the edge 21e of the recess 21 by the largest possible measure. The entire cylinder jacket surface at the convex end 22a is here located above the edge 21e, and is located in a cylinder jacket-shaped second depression 28 on the lower side (lingual side) of the slide 13. The second depression 28 and the convex end 22a of the locking element 22 enter into a positive-locking fit in this position, which secures the closed position of the slide 13.

In order to move the slide 13 out of the closed position into its open position, the slide 13 is pressed toward the right in line with the illustration on FIG. 7, which can be done by having a plunger engage into a depression 16 provided in the upper side (in the labial side) of the slide 13. As a result of the rightward pressure exerted on the slide 13 in line with FIG. 7, the latter exerts a downwardly directed pressure on the locking element 22 in the area of the second depression 28, so that the latter is pressed deeper into the recess 21, wherein a restoring force builds up in the tines 25. A low projection 29 adjoins the second depression 28 on the lower side of the slide 13. Once it has glided onto the convex end 22a of the locking element 22, the locking element 22 has reached its deepest point in the recess 21, as shown on FIG. 6. As shown on FIG. 7, the low projection 29 separates the first depression 30 and the second depression 28 from each other. As shown on FIG. 7, the low projection 29 can be deepened relative to the edge areas 37 and 38 of the lingual side of the slide 13, but less deepened than the first depression 30 and the second depression 28.

The low projection 29 is adjoined by a flat recess on the lower side of the slide 13, which ends at a stop 25. The flat recess involves a "first depression" 30 mentioned in claim 1. When the slide 13 glides onto the locking element 22 with its first depression 30, the latter can spring back out of the recess 21 by a measure determined by the distance between the lingual surface of the projection 29 and the floor of the first depression 30. This results in an engagement between the convex end 22a of the locking element 22 and the first depression 30, which holds the slide 13 in its open position. The first depression 30 serves only to prevent the slide 13 from inadvertently returning to its closed position. This safeguard need not be as reliable as the safeguard for the closed position, since the open position is only required during the treatment of a patient in orthopedic practice. By contrast, the closed position is better secured, because it is intended to prevent the slide from inadvertently 13 opening outside of orthodontic practice, in particular while chewing foods or gum, and thereby allow an archwire lying in the groove 7 to slide out.

A stop 31 on the lower side of the slide 13 that borders the first depression 30 prevents the slide 13 from being lost from the open position.

Figure 8:
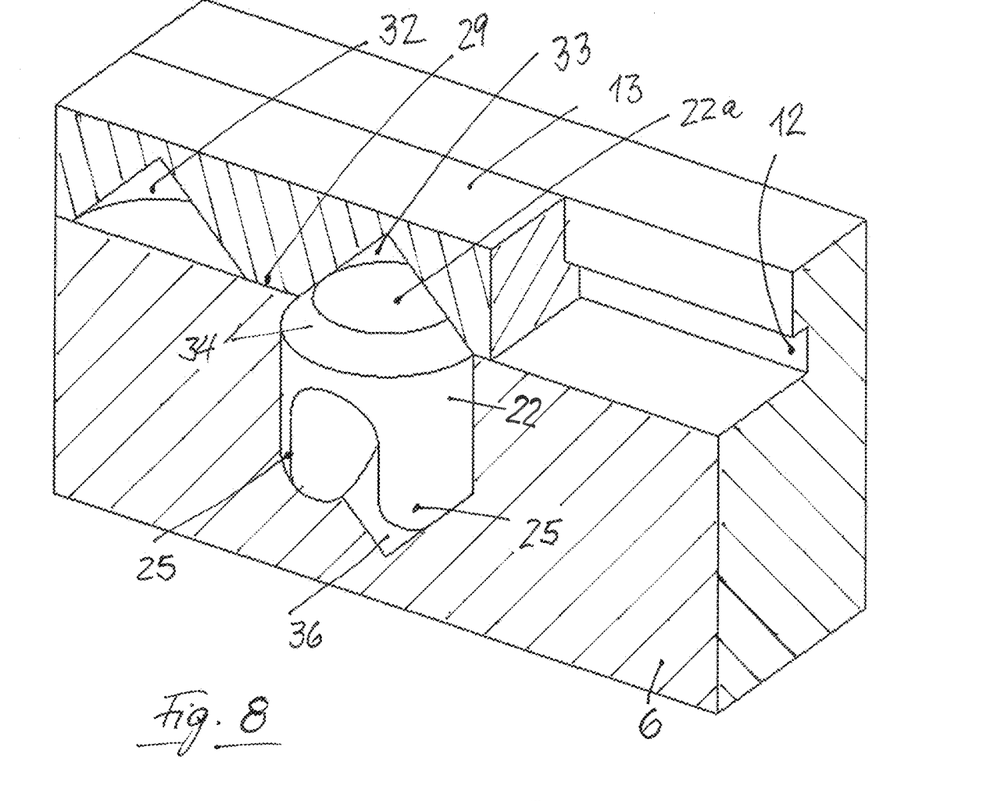
FIG. 8 shows, in a schematic, oblique view of a detail of the bracket cut in the displacement direction of the slide, a modification of the bracket depicted on FIGS. 1 to 7, in which the locking element is predominantly cylindrical in design, and the lower side of the slide is adjusted thereto, with the slide in its closed position.

FIG. 8 shows a cutout from the occlusal wall 6 of a bracket of the kind shown on FIGS. 1 to 7, wherein a cut is made through the longitudinal central plane of a section of the slide 13. The longitudinal central plane is here understood as the plane that centrally cuts the slide 13, and runs at a right angle to the longitudinal extension of the slot 7, and also cuts the base 10 of the slot 7 at a right angle (see FIG. 7).

The change relative to the example shown on FIGS. 1 to 7 lies in the fact that the locking element 22 is essentially a cylindrical body, which is slit from the lingual end to form two tines 25, and continues toward the labial end in a truncated cone 34, whose tip 22*a*, the labial end of the locking element 22, is a circular area.

The locking element 22 is inserted in a borehole 36 with a cylindrical section and an adjoining conical section.

Adjusted to this shape of the locking element 22, the first depression 32 and the second depression 33 in the lingual side of the slide 13 are conical in design.

As in the first illustrative embodiment, the slide 13 is guided in two undercuts, of which only one undercut 12 is shown on FIGS. 8 to 11 owing to the selected section.

Figure 9:
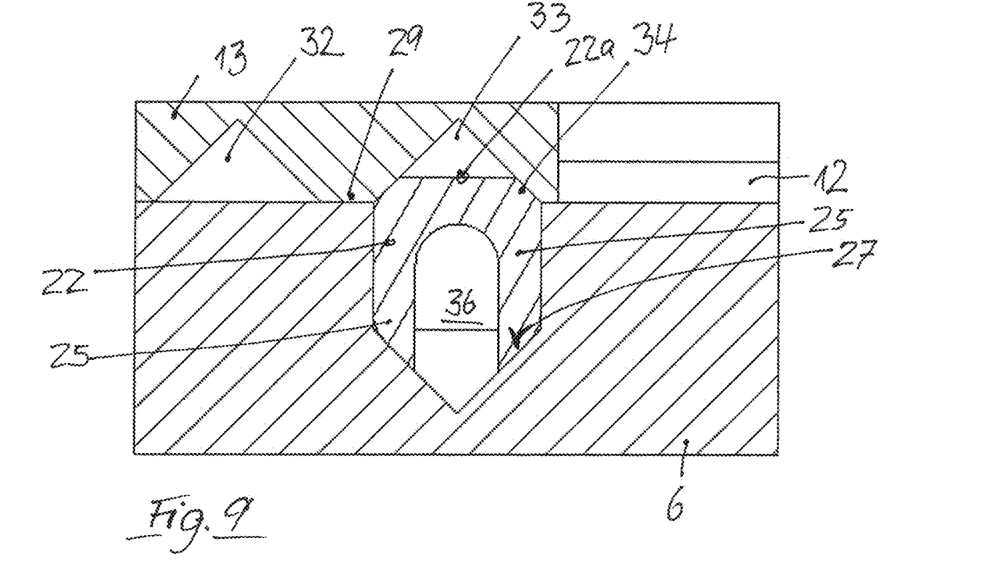
FIG. 9 shows a section of the detail depicted on FIG. 8, wherein the locking element is also cut, with the slide in its closed position.

FIGS. 8 and 9 show the slide 13 in its closed position, in which the truncated cone 34 of the locking element 22 engages into the conical second recess 33, whose opening angle coincides with the opening angle of the truncated cone 34.

Figure 10:
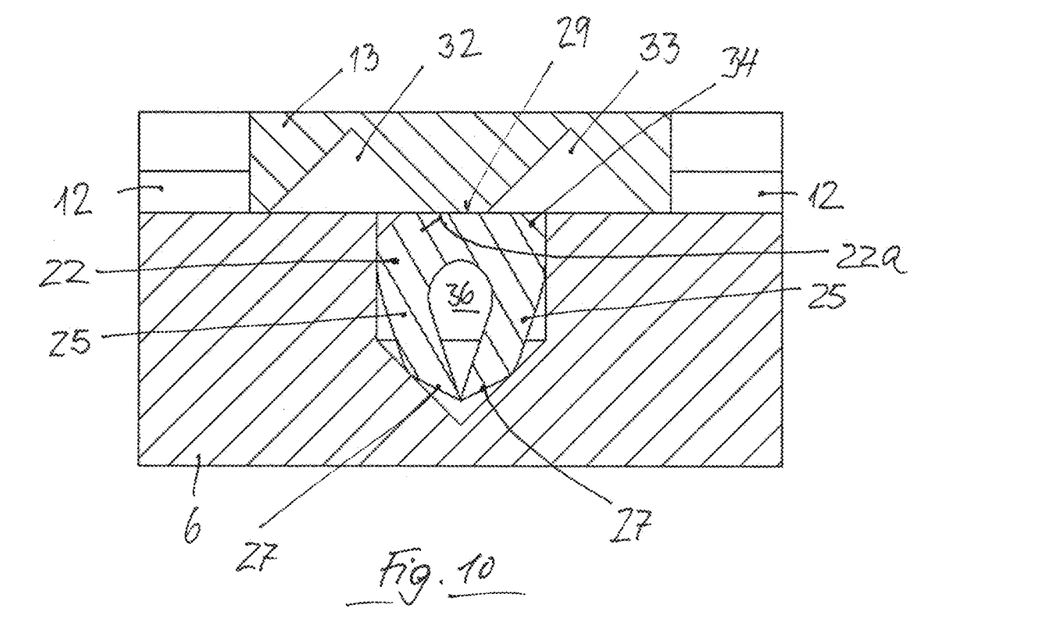
FIG. 10 shows a section as on FIG. 9, with the slide in an intermediate position between the open position and the closed position.

FIG. 10 shows the slide 13 in an intermediate position between its closed position and its open position. In this position, the slide 13 has pressed the locking element 22 deeper into the borehole 36, so that the two tines 25, whose inclined surfaces 27 rested on the conical surface of the borehole 36 in the closed position (FIGS. 8 and 9), were moved closer together at their tips. The projection 29 of the slide 13 lying between the two conical depressions 32 and 33 lies on the labial end 22*a* of the locking element 22, which presses against the lower side of the extension 29 owing to the bending stress in the tines 25.

Figure 11:
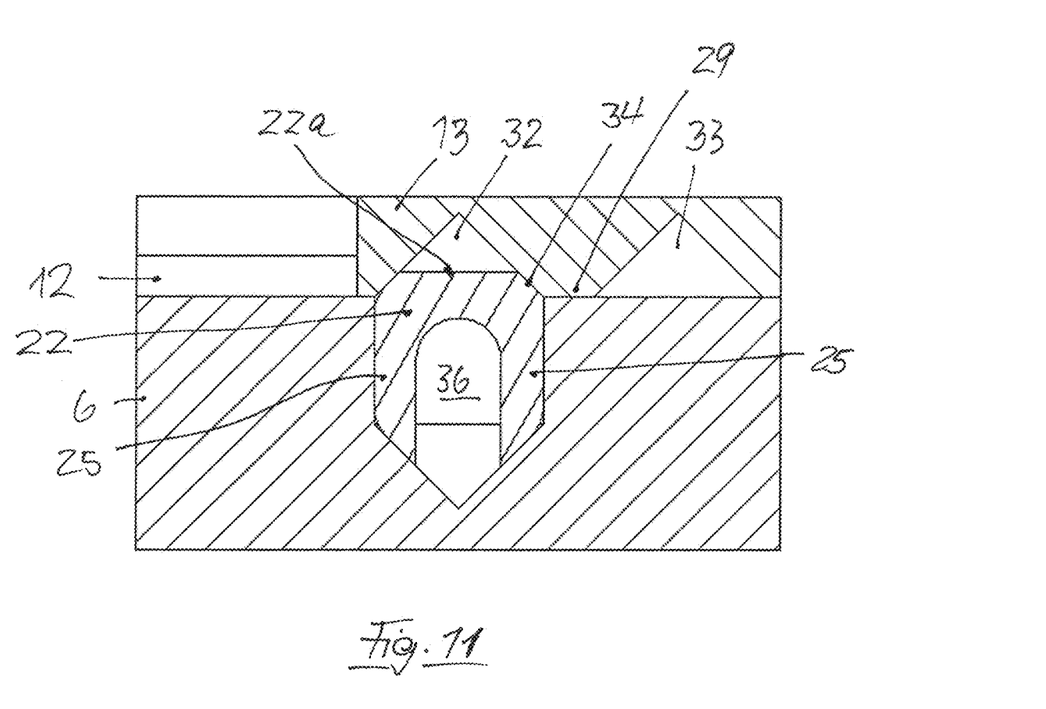
FIG. 11 shows a section as on FIG. 9, with the slide in its open position.

FIG. 11 shows the slide 13 in its open position, in which he conical first depression 32 lies above the borehole 36, and the locking element 22 has reversed the bending of its tines 25, and moved into the first conical depression 32 with its truncated cone 34.

As opposed to the preceding illustrative embodiment, the two conical depressions 32 and 33 have an identical depth in this embodiment.

REFERENCE LIST

1 Base
2 Lower side, lingual side
3 Depression
4 Socket
5 Gingival wall
6 Occlusal wall
7 Groove
8 Ligature wing
9 Ligature wing
9*a* Hook-shaped extension of the ligature wing 9
10 Bottom of groove 7
11 Undercut
12 Undercut
13 Slide
14 Labial recess
15 Labial recess
16 Depression in 13
17 Bottom of recess 15
18 Second stop
19 Front end
20 Bottom of the recess 14
21 Recess for locking element
21*a* Surface of the recess 21
21*b* Surface of the recess 21
21*c* Wall surface
21*d* Wall surface
21*e* Label edge of the recess 21
21*f* Wedge surface
21*g* Wedge surface
22 Locking element
22*a* Labial convex end
22*b* Lingual end
23 Arch-like body
24 Chamfer
25 Tines
26 Head section
27 Inclined surfaces or conical surfaces
28 Second depression
29 Projection
30 First depression
31 Stop on slide
32 First conical depression
33 Second conical depression
34 Truncated cone
36 Borehole
37 An edge area of the lingual side of the slide 13
38 An edge area of the lingual side of the slide 13

What is claimed is:

1. A self-ligating bracket for orthodontics, comprising:
a base;
an occlusal wall extending from the base;
a gingival wall extending from the base;
a groove, which separates the occlusal wall and the gingival wall from each other, and continuously extends in a mesial to a distal direction;
a slide, which has a labial side and a lingual side, and is held in a guide provided in the occlusal wall and/or in the gingival wall, and can be displaced in a gingival-occlusal direction in the guide between a closed position, in which the slide bridges the groove, and an open position, in which the groove is open in a labial direction; and
a means that can hold the slide in both its closed position and in its open position;
wherein the means comprise, in the gingival wall and/or in the occlusal wall, a locking element recess that is open toward the slide, in which is inserted a locking element, which has a convexly designed labial end protruding from the locking element recess, is directed against the lingual side of the slide, and has a lingual end located in the locking element recess;
provided in the slide on its lingual side are a first depression and a second depression, which are arranged in such a way that a convex end of the locking element protruding from the recess engages into the first depression when the slide is in its open position, and engages into the second depression when the slide is in its closed position;
wherein the bracket also comprises the following additional features:
the locking element is guided in the locking element recess so that the locking element can be displaced back and forth in a lingual-labial direction, and has at least one elastically or elastomerically bendable tines, which has an end facing in a labial to lingual direction, and glides onto a wall of the locking element recess surrounding the locking element as the locking element is displaced back and forth;
wherein the locking element recess tapers in the labial to lingual direction, wherein the locking element recess and the locking element are compatible with each other in terms of their shape and position in such a way that, when the slide is pushed over the convex end of the locking element, thereby forcing the locking element out of the first or second depression and deeper into the locking element recess, the at least one tine in the tapering section of the locking element recess is deflected by the wall, on which the at least one tines of the locking element glides deeper into the locking element recess, and is elastically or elastomerically bent;
wherein the locking element recess has a rectangular cross section and tapers like a wedge.

2. The bracket according to claim 1, wherein the at least one tine comprises at least two tines, wherein the at least two tines are moved closer together by being elastically or elastomerically bent when they are deflected by the wall, on which they glide deeper into the recess.

3. The bracket according to claim 1, wherein the locking element recess tapers continuously.

4. The bracket according to claim 1, wherein the locking element recess has a closed lingual end.

5. The bracket according to claim 1, wherein the locking element recess has a constant cross section in an area adjacent to the slide, and tapers thereafter.

6. The bracket according to claim 1, wherein the first depression and the second depression have a rectangular outline on the lingual side of the slide.

7. The bracket according to claim 1, wherein the locking element recess has a circular cross section and conically tapers.

8. The bracket according to claim 7, wherein the first depression and the second depression have a circular outline on the lingual side of the slide.

9. The bracket according to claim 1, wherein two tines arranged like a fork are provided on the locking element.

10. The bracket according to claim 9, wherein the tines can be moved closer to each other by pressing the locking element deeper into the locking element recess by exerting pressure on its convex end, during which one tine or both tines are bent by sliding on a wall in the tapering section of the locking element recess.

11. The bracket according to claim 10, wherein the two tines are mirror-inverted identical in design.

12. The bracket according to claim 1, wherein the locking element has an arch-like body, which consists of two mutually parallel running tines, and a head section that connects them, which carries the convex end of the locking element.

13. The bracket according to claim 1, wherein the locking element has outer edges that are provided with a chamfer.

14. The bracket according to claim 1, wherein the tines have inclined surfaces or conical surfaces that face the adjacent wall surface of the locking element recess at their ends.

15. The bracket according to claim 14, wherein the inclined surfaces or conical surfaces run parallel to the adjacent wall surface of the locking element recess in the relaxed state of the locking element.

16. The bracket according to claim 1, wherein a stop is provided on the body of the bracket, which prevents the slide from being displaced beyond the closed position while being moved from its open position into its closed position.

17. The bracket according to claim 16, wherein the stop is provided on the gingival wall.

18. The bracket according to claim 1, wherein at least a contour of the second depression is adjusted to the contour of the convex end of the locking element.

19. A self-ligating bracket for orthodontics, comprising:
a base;
an occlusal wall extending from the base;
a gingival wall extending from the base;
a groove, which separates the occlusal wall and the gingival wall from each other, and continuously extends in a mesial to a distal direction;
a slide, which has a labial side and a lingual side, and is held in a guide provided in the occlusal wall and/or in the gingival wall, and can be displaced in a gingival-occlusal direction in the guide between a closed position, in which the slide bridges the groove, and an open position, in which the groove is open in a labial direction; and
a means that can hold the slide in both its closed position and in its open position;
wherein the means comprise, in the gingival wall and/or in the occlusal wall, a locking element recess that is open toward the slide, in which is inserted a locking element, which has a convexly designed labial end protruding from the locking element recess, is directed against the lingual side of the slide, and has a lingual end located in the locking element recess;
provided in the slide on its lingual side are a first depression and a second depression, which are arranged in such a way that a convex end of the locking element protruding from the recess engages into the first depression when the slide is in its open position, and engages into the second depression when the slide is in its closed position;
wherein the bracket also comprises the following additional features:
the locking element is guided in the locking element recess so that the locking element can be displaced back and forth in a lingual-labial direction, and has at least one elastically or elastomerically bendable tine, which has an end facing in a labial to lingual direction, and glides onto a wall of the locking element recess surrounding the locking element as the locking element is displaced back and forth;
wherein the locking element recess tapers in the labial to lingual direction, wherein the locking element recess and the locking element are compatible with each other in terms of their shape and position in such a way that, when the slide is pushed over the convex end of the locking element, thereby forcing the locking element out of the first or second depression and deeper into the locking element recess, the at least one tine in the tapering section of the locking element recess is deflected by the wall, on which the at least one tines of the locking element glides deeper into the locking element recess, and is elastically or elastomerically bent;
wherein the locking element recess has a circular cross section and conically tapers.

20. A self-ligating bracket for orthodontics, comprising:
a base;
an occlusal wall extending from the base;
a gingival wall extending from the base;
a groove, which separates the occlusal wall and the gingival wall from each other, and continuously extends in a mesial to a distal direction;

a slide, which has a labial side and a lingual side, and is held in a guide provided in the occlusal wall and/or in the gingival wall, and can be displaced in a gingival-occlusal direction in the guide between a closed position, in which the slide bridges the groove, and an open position, in which the groove is open in a labial direction; and a means that can hold the slide in both its closed position and in its open position;

wherein the means comprise, in the gingival wall and/or in the occlusal wall, a locking element recess that is open toward the slide, in which is inserted a locking element, which has a convexly designed labial end protruding from the locking element recess, is directed against the lingual side of the slide, and has a lingual end located in the locking element recess;

provided in the slide on its lingual side are a first depression and a second depression, which are arranged in such a way that a convex end of the locking element protruding from the recess engages into the first depression when the slide is in its open position, and engages into the second depression when the slide is in its closed position;

wherein the bracket also comprises the following additional features:
  the locking element is guided in the locking element recess so that the locking element can be displaced back and forth in a lingual-labial direction, and has at least one elastically or elastomerically bendable tine, which has an end facing in a labial to lingual direction, and glides onto a wall of the locking element recess surrounding the locking element as the locking element is displaced back and forth;
  wherein the locking element recess tapers in the labial to lingual direction, wherein the locking element recess and the locking element are compatible with each other in terms of their shape and position in such a way that, when the slide is pushed over the convex end of the locking element, thereby forcing the locking element out of the first or second depression and deeper into the locking element recess, the at least one tine in the tapering section of the locking element recess is deflected by the wall, on which the at least one tines of the locking element glides deeper into the locking element recess, and is elastically or elastomerically bent;
  wherein two tines arranged like a fork are provided on the locking element.

21. A self-ligating bracket for orthodontics, comprising:
a base;
an occlusal wall extending from the base;
a gingival wall extending from the base;
a groove, which separates the occlusal wall and the gingival wall from each other, and continuously extends in a mesial to a distal direction;
a slide, which has a labial side and a lingual side, and is held in a guide provided in the occlusal wall and/or in the gingival wall, and can be displaced in a gingival-occlusal direction in the guide between a closed position, in which the slide bridges the groove, and an open position, in which the groove is open in a labial direction; and
a means that can hold the slide in both its closed position and in its open position;
wherein the means comprise, in the gingival wall and/or in the occlusal wall, a locking element recess that is open toward the slide, in which is inserted a locking element, which has a convexly designed labial end protruding from the locking element recess, is directed against the lingual side of the slide, and has a lingual end located in the locking element recess;
provided in the slide on its lingual side are a first depression and a second depression, which are arranged in such a way that a convex end of the locking element protruding from the recess engages into the first depression when the slide is in its open position, and engages into the second depression when the slide is in its closed position;
wherein the bracket also comprises the following additional features:
  the locking element is guided in the locking element recess so that the locking element can be displaced back and forth in a lingual-labial direction, and has at least one elastically or elastomerically bendable tine, which has an end facing in a labial to lingual direction, and glides onto a wall of the locking element recess surrounding the locking element as the locking element is displaced back and forth;
  wherein the locking element recess tapers in the labial to lingual direction, wherein the locking element recess and the locking element are compatible with each other in terms of their shape and position in such a way that, when the slide is pushed over the convex end of the locking element, thereby forcing the locking element out of the first or second depression and deeper into the locking element recess, the at least one tine in the tapering section of the locking element recess is deflected by the wall, on which the at least one tines of the locking element glides deeper into the locking element recess, and is elastically or elastomerically bent;
  wherein the locking element has outer edges that are provided with a chamfer.

22. A self-ligating bracket for orthodontics, comprising:
a base;
an occlusal wall extending from the base;
a gingival wall extending from the base;
a groove, which separates the occlusal wall and the gingival wall from each other, and continuously extends in a mesial to a distal direction;
a slide, which has a labial side and a lingual side, and is held in a guide provided in the occlusal wall and/or in the gingival wall, and can be displaced in a gingival-occlusal direction in the guide between a closed position, in which the slide bridges the groove, and an open position, in which the groove is open in a labial direction; and
a means that can hold the slide in both its closed position and in its open position;
wherein the means comprise, in the gingival wall and/or in the occlusal wall, a locking element recess that is open toward the slide, in which is inserted a locking element, which has a convexly designed labial end protruding from the locking element recess, is directed against the lingual side of the slide, and has a lingual end located in the locking element recess;
provided in the slide on its lingual side are a first depression and a second depression, which are arranged in such a way that a convex end of the locking element protruding from the recess engages into the first depression when the slide is in its open position, and engages into the second depression when the slide is in its closed position;

wherein the bracket also comprises the following additional features:
  the locking element is guided in the locking element recess so that the locking element can be displaced back and forth in a lingual-labial direction, and has at least one elastically or elastomerically bendable tine, which has an end facing in a labial to lingual direction, and glides onto a wall of the locking element recess surrounding the locking element as the locking element is displaced back and forth;
  wherein the locking element recess tapers in the labial to lingual direction, wherein the locking element recess and the locking element are compatible with each other in terms of their shape and position in such a way that, when the slide is pushed over the convex end of the locking element, thereby forcing the locking element out of the first or second depression and deeper into the locking element recess, the at least one tine in the tapering section of the locking element recess is deflected by the wall, on which the at least one tines of the locking element glides deeper into the locking element recess, and is elastically or elastomerically bent;
  wherein at least a contour of the second depression is adjusted to the contour of the convex end of the locking element.

\* \* \* \* \*